United States Patent
Nakashima et al.

(10) Patent No.: US 10,364,160 B2
(45) Date of Patent: Jul. 30, 2019

(54) PROCESS FOR PRODUCING POTASSIUM TITANATE

(71) Applicant: TOHO TITANIUM CO., LTD., Chigasaki-shi, Kanagawa (JP)

(72) Inventors: Mamoru Nakashima, Chigasaki (JP); Hideki Sakai, Chigasaki (JP); Daisuke Taki, Chigasaki (JP)

(73) Assignee: TOHO TITANIUM CO., LTD., Kanagawa (JP)

( * ) Notice: Subject to any disclaimer, the term of this patent is extended or adjusted under 35 U.S.C. 154(b) by 0 days.

(21) Appl. No.: 15/307,274

(22) PCT Filed: Mar. 11, 2015

(86) PCT No.: PCT/JP2015/057085
§ 371 (c)(1),
(2) Date: Oct. 27, 2016

(87) PCT Pub. No.: WO2015/166717
PCT Pub. Date: Nov. 5, 2015

(65) Prior Publication Data
US 2017/0044023 A1    Feb. 16, 2017

(30) Foreign Application Priority Data

Apr. 28, 2014   (JP) .................................. 2014-092275

(51) Int. Cl.
*C01G 23/00* (2006.01)

(52) U.S. Cl.
CPC .......... *C01G 23/005* (2013.01); *C01G 23/00* (2013.01)

(58) Field of Classification Search
CPC .................................................. C01G 23/005
See application file for complete search history.

(56) References Cited

U.S. PATENT DOCUMENTS

| | | | |
|---|---|---|---|
| 6,042,937 A | 3/2000 | Hayashi et al. | |
| 6,335,096 B1 | 1/2002 | Konnai | |
| 8,178,072 B2 * | 5/2012 | Hori ..................... | C01G 23/005 423/594.15 |
| 2007/0189958 A1 * | 8/2007 | Sakai .................. | C01G 23/047 423/610 |
| 2008/0131355 A1 | 6/2008 | Auer et al. | |
| 2008/0249222 A1 * | 10/2008 | Itoi ....................... | C01G 23/005 524/413 |

FOREIGN PATENT DOCUMENTS

| | | |
|---|---|---|
| EP | 2 138 461 A1 | 12/2009 |
| JP | 60-186418 A | 9/1985 |
| JP | 3-28126 A | 2/1991 |
| JP | 4-136220 A | 5/1992 |
| JP | 7-53214 A | 2/1995 |
| JP | 10-177714 A | 6/1998 |
| JP | 2000-256013 A | 9/2000 |
| JP | 2008-110918 A | 5/2008 |
| JP | 2008-513324 A | 5/2008 |
| JP | 2008-266131 A | 11/2008 |
| JP | 2014-24724 A | 2/2014 |

OTHER PUBLICATIONS

Wetchakun et. al., "Effect of temperature on the degree of anatase-rutile transformation in titanium dioxide nanoparticles synthesized by the modified sol-gel method", 2008, Current Applied Physics, 8, 343-346.*
International Search Report dated Jun. 16, 2015, issued in counterpart International Application No. PCT/JP2015/057085 (2 pages).
Office Action dated Jun. 23, 2017, issued in counterpart Chinese Application No. 201580021195.0, with English translation. (7 pages).
Extended (supplementary) European Search Report dated Nov. 8, 2017, issued in counterpart European Application No. 15785321.9. (6 pages).

* cited by examiner

*Primary Examiner* — James A Fiorito
(74) *Attorney, Agent, or Firm* — Westerman, Hattori, Daniels & Adrian, LLP

(57) ABSTRACT

A method for producing a potassium titanate easily produces a potassium titanate having a high single phase ratio and a significantly reduced fibrous potassium titanate content in high yield. The method for producing a potassium titanate includes: a mixing step that mixes a titanium raw material with a potassium raw material, the titanium raw material including 0 to 60 mass % of titanium oxide having a specific surface area of 1 to 2 $m^2/g$, 40 to 100 mass % of titanium oxide having a specific surface area of 7 to 200 $m^2/g$, and 0 to 4.5 mass % in total of one or more materials selected from titanium metal and titanium hydride, and the potassium raw material including a potassium compound; a calcination step that calcines a raw material mixture obtained by the mixing step at a calcination temperature of 950 to 990° C.; and a grinding step that grinds a calcined powder obtained by the calcination step using one or more means selected from a vibrating mill and an impact pulverizer.

6 Claims, No Drawings

US 10,364,160 B2

PROCESS FOR PRODUCING POTASSIUM TITANATE

TECHNICAL FIELD

The present invention relates to a method for producing a potassium titanate.

BACKGROUND ART

A potassium titanate is useful as a friction material for producing a friction sliding member e.g., brake lining, disc pad, and clutch facing) that is provided to a braking device used for automobiles, railroad vehicles, airplanes, industrial machines, and the like. A potassium titanate is represented by the general formula: $K_2O \cdot nTiO_2$ (wherein n is an integer from 1 to 12). In particular; potassium hexatitanate represented by $K_2O \cdot 6TiO_2$ (n=6) has a tunnel crystal structure, and it is known that a friction material that includes fibrous potassium hexatitanate (fibrous potassium hexatitanate particles) exhibits excellent heat resistance and the like.

However, a fibrous potassium titanate is bulky, and exhibits inferior formability. Moreover, it is difficult to uniformly disperse a fibrous potassium titanate in a friction material due to low fluidity (i.e., a fibrous potassium titanate is difficult to handle).

In view of this problem, a non-fibrous potassium titanate obtained by grinding calcined potassium hexatitanate using an impact mill has been proposed (see Patent Literature 1 (JP-A-2008-110918)). Patent Literature 1 discloses a non-fibrous potassium titanate that includes a powder having a diameter of 3 μm or less, a length of 5 μm or more, and an aspect ratio (length/diameter ratio) of 3 or more (as measured using an electron microscope) in a ratio of 0.7 to 3.0%. However, a production method that can further reduce the content of a fibrous potassium titanate has been desired.

A method for producing potassium hexatitanate having a high single phase ratio has also been desired.

CITATION LIST

Patent Literature

Patent Literature 1: JP-A-2008-110918

SUMMARY OF INVENTION

Technical Problem

In view of the above situation, an object of the invention is to provide a method that can easily produce a potassium titanate having a high single phase ratio and a significantly reduced fibrous potassium titanate content in high yield.

Solution to Problem

In order to solve the above technical problem, the inventors conducted extensive studies with regard to each raw material, a calcination step, and a calcined powder grinding step. As a result, the inventors found that the above technical problem can be solved by producing a potassium titanate by performing a mixing step that mixes a titanium raw material with a potassium raw material, the titanium raw material including 0 to 60 mass % of titanium oxide having a specific surface area of 1 to 2 $m^2/g$, 40 to 100 mass % of titanium oxide having a specific surface area of 7 to 200 $m^2/g$, and 0 to 4.5 mass % of titanium metal, and the potassium raw material including a potassium compound; a calcination step that calcines a raw material mixture obtained by the mixing step at a calcination temperature of 950 to 990° C. to obtain a calcined powder; and a grinding step that grinds the calcined powder obtained by the calcination step using one or more means selected from a vibrating mill and an impact pulverizer. This finding has led to the completion of the invention.

Specifically, one aspect of the invention provides the following method for producing a potassium titanate.

(1) A method for producing a potassium titanate including:

a mixing step that mixes a titanium raw material with a potassium raw material, the titanium raw material including 0 to 60 mass % of titanium oxide having a specific surface area of 1 to 2 $m^2/g$, 40 to 100 mass % of titanium oxide having a specific surface area of 7 to 200 $m^2/g$, and 0 to 4.5 mass % in total of one or more materials selected from titanium metal and titanium hydride, and the potassium raw material including a potassium compound;

a calcination step that calcines a raw material mixture obtained by the mixing step at a calcination temperature of 950 to 990° C.; and a grinding step that grinds a calcined powder obtained by the calcination step using one or more means selected from a vibrating mill and an impact pulverizer.

(2) The method for producing a potassium titanate according to (1), wherein the mixing step mixes the titanium raw material and the potassium raw material using a vibrating mill.

Advantageous Effects of Invention

According to one aspect of the invention, a calcined powder having a reduced diameter (minor axis), an average aspect ratio (i.e., an average ratio of the longitudinal length (major axis) to the diameter (minor axis)) equal to or higher than a given value, and a relatively high content of a fibrous material, is obtained by calcining the titanium raw material and the potassium raw material at a temperature within a specific range when producing a potassium titanate by calcining the titanium raw material and the potassium raw material, and a potassium titanate having a significantly reduced fibrous potassium titanate content is easily produced in high yield by grinding (pulverizing) the calcined powder using a specific grinding means.

According to one aspect of the invention, it is possible to easily produce a potassium titanate having an improved single phase ratio by utilizing a titanium raw material having a specific surface area within a specific range, and calcining the titanium raw material and the potassium raw material at a temperature within a specific range.

One aspect of the invention thus provides a method that can easily produce a potassium titanate having a high single phase ratio and a significantly reduced fibrous potassium titanate content in high yield.

DESCRIPTION OF EMBODIMENTS

A method for producing a potassium titanate according to one embodiment of the invention includes: a mixing step that mixes a titanium raw material with a potassium raw material, the titanium raw material including 0 to 60 mass % of titanium oxide having a specific surface area of 1 to 2 $m^2/g$, 40 to 100 mass % of titanium oxide having a specific surface area of 7 to 200 $m^2/g$, and 0 to 4.5 mass % in total of one or more materials selected from titanium metal and titanium hydride, and the potassium raw material including a potassium compound; a calcination step that calcines a raw material mixture obtained by the mixing step at a calcination temperature of 950 to 990° C.; and a grinding step that grinds a calcined powder obtained by the calcination step using one or more means selected from a vibrating mill and an impact pulverizer.

When implementing the method for producing a potassium titanate according to one embodiment of the invention, the content of the titanium oxide having a specific surface area of 1 to 2 $m^2/g$ in the titanium raw material is 0 to 60 mass %, preferably 0 to 40 mass %, and more preferably 0 to 20 mass %.

When the content of the titanium oxide having a specific surface area of 1 to 2 $m^2/g$ in the titanium raw material is within the above range, the method for producing a potassium titanate according to one embodiment of the invention can easily produce a potassium titanate having a significantly reduced fibrous potassium titanate content.

Note that the term "specific surface area" used herein in connection with titanium oxide refers to a value measured using the BET method at a degassing temperature of 350° C. for a degassing time of 45 minutes utilizing a specific surface area analyzer (manufactured by Quantachrome Instruments).

When implementing the method for producing a potassium titanate according to one embodiment of the invention, the content of the titanium oxide having a specific surface area of 7 to 200 $m^2/g$ in the titanium raw material is 40 to 100 mass %, preferably 60 to 100 mass %, and more preferably 80 to 100 mass %.

When the content of the titanium oxide having a specific surface area of 7 to 200 $m^2/g$ in the titanium raw material is within the above range, the dispersibility of the titanium oxide raw material is easily improved when mixing the raw materials, and it is possible to easily improve the single phase ratio of the resulting potassium titanate (i.e., target product) when implementing the method for producing a potassium titanate according to one embodiment of the invention.

It is preferable that the titanium oxide having a specific surface area of 7 to 200 $^2/g$ that is used when implementing the method for producing a potassium titanate according to one embodiment of the invention, have a specific surface area of 7 to 50 $m^2/g$, and more preferably 7 to 25 $m^2/g$.

When titanium oxide having a specific surface area within the above range is used, it is possible to easily produce a potassium titanate having a significantly reduced fibrous potassium titanate content. Moreover, it is possible to more easily produce a potassium titanate by reducing the ratio of adhesion to a reaction vessel or a furnace material (e.g., furnace wall material) during calcination.

The titanium oxide included in the titanium raw material used when implementing the method for producing a potassium titanate according to one embodiment of the invention serves as a titanium source for producing a potassium titanate through calcination. It is preferable to use a titanium oxide that is is advantageous for producing potassium hexatitanate as the potassium titanate.

The titanium oxide included in the titanium raw material used when implementing the method for producing a potassium titanate according to one embodiment of the invention normally has a particulate shape.

Examples of the titanium oxide having a specific surface area of 1 to 2 $m^2/g$ and the titanium oxide having a specific surface area of 7 to 200 $m^2/g$ used when implementing the method for producing a potassium titanate according to one embodiment of the invention may be one or more titanium oxides selected from titanium dioxide, titanium suboxide, and the like. It is preferable to use titanium dioxide as the titanium oxide.

Titanium dioxide can suitably be used as the titanium compound since titanium dioxide exhibits excellent mixability and reactivity with the potassium compound, and is inexpensive.

It is preferable to use ruffle-type titanium dioxide or anatase-type titanium dioxide, and more preferably anatase-type titanium dioxide. It is preferable to use titanium dioxide having a purity of 90% or more.

It is preferable that the titanium oxide included in the titanium raw material used when implementing the method for producing a potassium titanate according to one embodiment of the invention be in the form of aggregates or granulated products. When the titanium oxide is in the form of aggregates or granulated products, the titanium oxide can be uniformly (homogenously) mixed with the potassium raw material that includes the potassium compound.

Aggregates (including granules) or granulated products of titanium dioxide are preferable as the aggregates or granulated products of the titanium oxide.

The term "aggregates" used herein in connection with the titanium oxide refers to large particles (including granules) that are (n+1)th-order particles (where, n is an integer equal to or larger than 1) formed by the aggregation of nth-order particles of the titanium oxide (e.g., secondary particles formed by the aggregation of primary particles of the titanium oxide, or tertiary particles formed by the aggregation of secondary particles of the titanium oxide), and have an average particle size of 0.1 mm or more.

The term "granulated products" used herein in connection with the titanium oxide refers to products that are obtained by granulating a titanium oxide powder, and have an average particle size of 0.1 mm or more.

Examples of the aggregates of titanium dioxide include aggregates of titanium dioxide produced using titanium sulfate or titanyl sulfate (i.e., titanium oxide produced by a sulfuric acid method), and aggregates of titanium dioxide produced by subjecting titanium tetrachloride to gas-phase oxidation or hydrolysis (i.e., titanium oxide produced by a gas-phase method), aggregates of titanium dioxide produced by neutralizing or hydrolyzing a titanium tetrachloride aqueous solution or an alkoxytitanium.

Examples of the granulated products of titanium dioxide include granulated products of titanium dioxide obtained by granulating commercially-available titanium oxide fine particles using a spray drying method, granulated products of titanium dioxide obtained by adding a binder to commercially-available titanium oxide fine particles, and granulating the mixture, and the like.

When the granulated products of titanium dioxide are used as the titanium compound, and mixed with the potassium compound using a mechanical mixer (mixing device) that applies a large amount of grinding energy (e.g., vibrating mill), it is possible to effectively suppress adhesion of the mixture to the inner wall of the mixer (e.g., vibrating mill), and easily and uniformly mix the titanium compound and the potassium compound.

When implementing the method for producing a potassium titanate according to one embodiment of the invention, the total content of one or more materials selected from titanium metal and titanium hydride in the titanium raw material is 0 to 4.5 mass %, preferably 0 to 2.0 mass %, and more preferably 0 mass %.

Titanium metal and titanium hydride that may be used as the titanium raw material are further oxidized to produce titanium dioxide when the method for producing a potassium titanate according to one embodiment of the invention is implemented. When the raw material mixture obtained by the mixing step includes titanium metal or titanium hydride, titanium metal or titanium hydride is burned inside the reaction vessel during calcination together with the titanium compound and the potassium compound, and suppresses a situation in which an uneven temperature distribution occurs inside the reaction vessel, and the reaction can be effected more uniformly. This makes it possible to easily obtain a potassium titanate having the desired composition.

When the total content of one or more materials selected from titanium metal and titanium hydride in the titanium raw material used in the mixing step is within the above range, it is possible to easily improve the single phase ratio of the resulting potassium titanate (i.e., target product) when implementing the method for producing a potassium titanate according to one embodiment of the invention. Moreover, since the content of the titanium oxide having a specific surface area of 7 to 200 $m^2/g$ in the titanium raw material can be adjusted to a value within a given range, it is possible to easily produce a potassium titanate having a significantly reduced fibrous potassium. titanate content.

The potassium compound included in the potassium raw material used when implementing the method for producing a potassium titanate according to one embodiment of the invention serves as a potassium source for producing a potassium titanate through calcination. It is preferable to use a potassium compound that is advantageous for producing potassium hexatitanate as the potassium titanate.

The potassium compound used when implementing the method for producing a potassium titanate according to one embodiment of the invention may be one or more potassium compounds selected from potassium oxide, potassium carbonate, potassium hydroxide, potassium oxalate, and the like. It is preferable to use potassium carbonate as the potassium compound.

These potassium compounds are inched or decomposed during calcination, and easily react with the titanium raw material. Moreover, since these potassium compounds merely produce carbon dioxide, water, and the like upon decomposition, impurities rarely remain in the product.

The potassium compound used when implementing the method for producing a potassium titanate according to one embodiment of the invention normally has a powdery shape. The specific surface area of the potassium compound is preferably 0.5 to 10.0 $m^2/g$, more preferably 1.0 to 8.0 $m^2/g$, and still more preferably 1.5 to 7.5 $m^2/g$, from the viewpoint of ease of handling.

Note that the term "specific surface area" used herein in connection with the potassium compound refers to a value measured using the BET method.

In the mixing step included in the method for producing a potassium titanate according to one embodiment of the invention, the titanium raw material is mixed with the potassium raw material that includes the potassium compound.

When the desired potassium titanate is potassium hexatitanate, it is theoretically efficient to subject the titanium raw material and the potassium raw material to the mixing step so that the molar ratio (titanium atoms:potassium atoms) of the titanium atoms to the potassium atoms is 6:2. Note that it is preferable to subject the titanium raw material and the potassium raw material to the mixing step so that the theoretical ratio (amount) of the potassium atoms is exceeded by more than 0 mol % and 15 mol % or less (more preferably 5 to 15 mol %, and still more preferably 10 to 14 mol %), taking account of volatilization that occurs in the subsequent calcination step.

It is possible to improve the single phase ratio of the resulting potassium titanate by mixing the titanium raw material and the potassium raw material in a ratio within the above range.

In the mixing step included in the method for producing a potassium titanate according to one embodiment of the invention, a lithium compound (e.g., lithium carbonate) and an alkaline-earth metal compound (e.g., magnesium compound and barium compound) may be further mixed with the titanium raw material and the potassium raw material.

When the raw material mixture obtained by the mixing step includes a lithium compound (e.g., lithium carbonate), it is possible to easily control the shape of the resulting potassium titanate so that the potassium titanate has the desired shape.

When the raw material mixture obtained by the mixing step includes an alkaline-earth metal compound (e.g., magnesium compound and barium compound), it is possible to easily control the shape of the resulting potassium titanate so that the potassium titanate has the desired shape while suppressing the production of fibrous crystals during calcination (described later).

In the mixing step included in the method for producing a potassium titanate according to one embodiment of the invention, a trace amount of an additional compound such as an inorganic oxide may be farther mixed with the titanium compound and the potassium compound as long as the production of the potassium titanate is not affected.

The inorganic oxide may be one or more inorganic oxides selected from $Fe_2O_3$, $Al_2O_3$, $SiO_2$, $CeO_2$, $WO_3$, $ZrO_2$, $Zr(CO_3)_2$, $CaCO_3$, and the like.

When the raw material mixture obtained by the mixing step included in the method for producing a potassium titanate according to one embodiment of the invention further includes the inorganic oxide in addition to the titanium raw material and the potassium raw material, the (total) content (on a solid basis) of the inorganic oxide in the raw material mixture is preferably 5 mass % or less, more preferably 3 mass % or less, and still more preferably 1 mass % or less.

It is preferable that the raw material mixture Obtained by the mixing step included in the method for producing a potassium titanate according to one embodiment of the invention include the titanium raw material and the potassium raw material in a ratio (on a solid basis) of 85 to 100 mass %, and more preferably 85 to 97 mass %.

The mixing step included in the method for producing a potassium titanate according to one embodiment of the invention mixes each raw material to prepare the raw material mixture. The components may be mixed using a dry mixing method or a wet mixing method. It is preferable to use a dry mixing method from the viewpoint of simplifying the process.

It is preferable that the mixing step included in the method for producing a potassium titanate according to one embodiment of the invention mix each raw material using a known mixing means. The mixing means may be one or more mixing means selected from a vibrating mill (e.g., vibrating rod mill and vibrating ball mill), a mixer such as a rotary vessel-type mixer (e.g., horizontal cylinder-type mixer, inclined cylinder-type mixer, and V-type mixer), and a mechanical agitation-type mixer (e.g., ribbon blade agitation-type mixer, screw agitation-type mixer, and rod agitation-type mixer), a media flow-type mixer-grinder e.g., ball mill and planetary mill), an agitation-type mixer-grinder (e.g., tower mill, media agitating mill, and tube-type mill), a mortar (e.g., agate mortar, alumina mortar, and automated mortar), and the like. It is preferable to use a vibrating mill, and it is more preferable to use a vibrating rod mill.

The vibrating rod mill mixes the titanium raw material and the potassium raw material while grinding the titanium raw material, and the potassium raw material using rods. In this case, a powder having a (relatively) large particle size is ground between the rods while particles having a (relatively) small particle size are ground to only a small extent (i.e., a situation in which a fine powder is ground to a large extent (that may occur when using a ball mill) does not occur).

In particular, titanium oxide exhibits high adhesion due to hydroxyl groups present on the surface thereof, and increases in specific surface area as the particle size decreases due to grinding, whereby the ground product easily adheres to the mixing vessel. Specifically, it is possible to more uniformly mix the raw materials by utilizing the vibrating rod mill as compared with the case of mixing the raw materials using another mixing method (means). This makes it possible to more uniformly calcine the raw material mixture in the subsequent step described later, and easily produce a potassium titanate having the desired composition.

When mixing the raw materials using the vibrating mill, the amplitude is preferably set to 2 to 6 mm, and the mixing (processing) time is preferably set to 10 to 120 minutes.

When mixing the raw materials using the vibrating mill, it is preferable to mix wood chips, an organic solvent (e.g., alcohol, toluene, hexane, heptane, and acetone), water, and the like together with the raw materials in order to improve dispersibility.

This makes it possible to obtain the raw material mixture in which the titanium oxide and the potassium compound are more uniformly dispersed while suppressing adhesion of the titanium oxide and the like inside the vibrating mill.

The organic solvent and the like can be easily removed from the resulting raw material mixture by vaporizing the organic solvent and the like by appropriately heating the raw material mixture, for example.

The method for producing a potassium titanate according to one embodiment of the invention calcines the raw material mixture obtained by the mixing step at a calcination temperature of 950 to 990° C. The lower limit of the calcination temperature is preferably 960° C., and more preferably 970° C. The upper limit of the calcination temperature is preferably 987° C., and more preferably 985° C.

If the calcination temperature is less than 950° C., it may be difficult to improve the single phase ratio of the resulting potassium titanate. If the calcination temperature exceeds 990° C., the content of a fibrous potassium titanate in the potassium titanate obtained by the grinding step (described later) may increase.

The method for producing a potassium titanate according to one embodiment of the invention can improve the single phase ratio of the potassium titanate (target product) while suppressing growth in the minor-axis (diameter) direction and allowing growth in the major-axis direction so that an excessive increase in length does not occur, by calcining the raw material mixture obtained by the mixing step at a temperature within the above range.

The heating rate until the calcination temperature employed in the calcination step is reached is not particularly limited, but is preferably 2 to 70° C./min. The lower limit and the upper limit of the heating rate are preferably 3° C./min and 50° C./min, respectively, taking account of the reaction efficiency.

In the calcination step included in the method for producing a potassium titanate according to one embodiment of the invention, it is preferable to calcine the raw material mixture at the desired calcination temperature for 10 minutes or more (more preferably 10 to 60 minutes, and still more preferably 20 to 40 minutes). It is possible to suppress growth in the minor-axis direction by setting the calcination time to be within the above range.

When the calcination step included in the method for producing a potassium titanate according to one embodiment of the invention is effected for a time within the above range, it is possible to further reduce the content of a fibrous potassium titanate in the potassium titanate obtained by the grinding step (described later).

When implementing the method for producing a potassium titanate according to one embodiment of the invention, it is preferable to cool the calcined product from the desired calcination temperature to 500° C. at a cooling rate of 2 to 300° C./min.

The lower limit of the cooling rate employed when implementing the method for producing a potassium titanate according to one embodiment of the invention is preferably 5° C./min, and more preferably 20° C./min. The upper limit of the cooling rate is preferably 200° C./min, and more preferably 150° C./min.

When the cooling rate from the desired calcination temperature is within the above range, the method for producing a potassium titanate according to one embodiment of the invention can improve the single phase ratio of the potassium titanate (target product) while suppressing growth in the minor-axis direction and suppressing an excessive increase in length in the major-axis direction. This makes it possible to further reduce the content of a fibrous potassium titanate in the potassium titanate obtained by the grinding step (described later).

It is preferable that the calcined powder obtained by the calcination step have an average major axis (i.e., average longitudinal length) of 2.0 μm or less, more preferably 0.5 to 2.0 μm, and still more preferably 0.8 to 1.7 μm.

It is preferable that the calcined powder have an average minor axis (i.e., average diameter) of 1.0 μm or less, and more preferably 0.1 to 0.5 μm.

It is preferable that the calcined powder have an average aspect ratio (longitudinal length (major axis)/diameter (minor axis)) of 3.0 or more, more preferably 3.0 to 6.0, and still more preferably 3.0 to 5.0.

Note that the terms "average major axis", "average minor axis", and "average aspect ratio" used herein in connection with the calcined powder refer to values measured in the same manner as described later in connection with the average major axis, the average minor axis, and the average aspect ratio of the potassium titanate.

In the calcination step included in the method for producing a potassium titanate according to one embodiment of the invention, the raw material mixture may be calcined in a state in which a reaction vessel is charged with the raw material mixture obtained by the mixing step, or a binder or the like may be added to the raw material mixture, and the resulting mixture may be formed so as to have the desired shape, and calcined, or the raw material mixture may be introduced into a rotary kiln or the like, and calcined in a fluid state. It is preferable to calcine the raw material mixture in a fluid state using a rotary kiln or the like.

It is preferable that the reaction vessel or the furnace used for the calcination step included in the method for producing a potassium titanate according to one embodiment of the invention be made of a ceramic (ceramic material). Specific examples of the ceramic material include alumina and the like. The reaction vessel or the furnace used for the calcination step may have a cylindrical shape, a columnar shape having a recess, a square shape having a recess, a dish-like shape, or the like.

When the raw material mixture is brought into contact with the reaction vessel or the furnace made of a ceramic, it is preferable to provide a sheet member formed of a material that is carbonized during calcination in an area in which the raw material mixture comes in contact with the reaction vessel or the furnace.

The sheet member (that is formed of a material that is carbonized during calcination) is preferably formed of a material that is burned off during calcination, and does not produce a soft product or fluid. The sheet member may be formed of one or more materials selected from paper, a natural fiber cloth, bark, a thermosetting resin sheet, and the like.

When the sheet member (that is formed of a material that is carbonized during calcination) is formed of paper, it is preferable to use paper to which a material that is not easily carbonized, but softens (e.g., vinyl chloride), is not bonded. Examples of such paper include wrapping paper (e.g., unbleached kraft paper, unglazed bleached kraft paper, and machine glazed bleached kraft paper), container board, newsprint, high-quality paper, medium-quality paper, recycled paper, book paper, cast-coated paper, coated paper, communication paper (e.g., PPC paper), and the like.

When the sheet member (that is formed of a material that is carbonized during calcination) is formed of a natural fiber cloth, the natural fibers may be cotton, hemp, silk, or the like. When the sheet member (that is formed of a material that is carbonized during calcination) is formed of a thermosetting resin sheet, the thermosetting resin may be a phenol resin, an epoxy resin, a melamine resin, or the like.

The sheet member (that is formed of a material that is carbonized during calcination) may be in the form of a sheet, a woven fabric, a nonwoven fabric, a bag, or the like.

It is possible to prevent a situation in which the potassium compound included in the raw material mixture is melted (i.e., the raw material is wasted) during calcination, or the potassium compound that has been melted during calcination penetrates the reaction vessel or the furnace that is made of a ceramic when implementing the method for producing a potassium titanate according to one embodiment of the invention, by providing the sheet member (that is formed of a material that is carbonized during calcination) in an area in which the raw material mixture comes in contact with the reaction vessel or the furnace that is made of a ceramic.

When implementing the method for producing a potassium titanate according to one embodiment of the invention, it is possible to advantageously prevent a situation in which the potassium compound is wasted, or the potassium compound penetrates the reaction vessel that is made of a ceramic, by introducing the raw material mixture in a state in which the sheet member is placed at the bottom of the recess formed in the reaction vessel that is made of a ceramic, for example.

It is possible to more advantageously prevent a situation in which the potassium compound is wasted, or the potassium compound penetrates the reaction vessel that is made of a ceramic, by introducing the raw material mixture in a state in which the sheet member is placed over the entire inner wall of the recess formed in the reaction vessel that is made of a ceramic, for example.

In the grinding step included in the method for producing a potassium titanate according to one embodiment of the invention, the calcined powder obtained by the calcination step is ground using one or more means selected from a vibrating mill and an impact pulverizer.

When implementing the method for producing a potassium titanate according to one embodiment of the invention, the calcined powder obtained by the calcination step is ground using a vibrating mill (e.g., a vibrating rod mill or a vibrating ball mill) or an impact pulverizer (e.g., a high-speed rotary mill, a high-speed rotary mill provided with a classifier, a vibrating media mill, a media agitating mill, or a jet mill). These grinding means may be used in combination.

It is preferable to use a vibrating rod mill and a high-speed rotary mill provided with a classifier in combination. It is preferable to grind the calcined powder using a vibrating rod mill, and then grind the calcined powder using a high-speed rotary mill provided with a classifier. It is possible to easily reduce the content of a fibrous material (fibrous potassium titanate) in the resulting potassium titanate by utilizing a vibrating rod mill and a high-speed rotary mill provided with a classifier in combination.

When the calcined powder is ground in the grinding step using a vibrating rod mill, the amplitude is preferably set to 2 to 6 mm, and the calcined powder feed rate is preferably set to 20 to 100 kg/hr.

When the calcined powder is ground in the grinding step using a high-speed rotary mill provided with a classifier, the rotational speed is preferably set to 40,000 to 100,000 rpm, and the calcined powder feed rate is preferably set to 20 to 100 kg/hr.

The calcined powder obtained by the calcination step (process) includes columnar potassium titanate crystals having an increased length in the diameter (minor-axis) direction. Most of the columnar potassium titanate crystals are aggregates that are relatively strongly bonded, and can be ground by the grinding step (process) so as to have the desired particle size.

The ground product obtained by the grinding step (process) is optionally classified or sieved to obtain a potassium titanate having the desired particle size distribution.

The method for producing a potassium titanate according to one embodiment of the invention can easily and inexpensively produce the desired potassium titanate (e.g., potassium hexatitanate) by merely calcining the raw material mixture without performing a known component adjustment process (e.g., pH adjustment or washing with an acid) after calcination.

It is considered that the method for producing a potassium titanate according to one embodiment of the invention can suppress growth in the major-axis direction as a result of using the titanium raw material that includes titanium oxide having a specific surface area of 7 to 200 $m^2/g$ in a ratio of 40 mass % or more, and calcining the raw material mixture obtained by the mixing step at a calcination temperature of 950 to 990° C., and can further reduce the major axis of the resulting potassium titanate, improve the dispersibility of the resulting potassium titanate, and improve the single phase ratio of the potassium titanate as a result of grinding the calcined powder using one or more means selected from a vibrating mill and an impact pulverizer.

It is preferable that the potassium titanate produced using the method for producing a potassium titanate according to one embodiment of the invention have an average diameter (average minor axis) of 0.05 to 1 μm, and more preferably 0.05 to 0.7 μm. It is preferable that the potassium titanate produced using the method for producing a potassium titanate according to one embodiment of the invention have an average longitudinal length (average major axis) of 0.1 to 1.5 μm, and more preferably 0.2 to 1.0 μm.

It is preferable that the potassium titanate produced using the method for producing a potassium titanate according to one embodiment of the invention have an average aspect ratio (longitudinal length (major axis)/diameter (minor axis)) of 1 to 3.5, and more preferably 1 to 2.

Note that the term "average particle size" used herein in connection with the potassium titanate refers to a diameter that corresponds to a cumulative volume of 50% when the area of a projection image of each of about ten thousand potassium titanate particles is measured using a particle size/shape distribution analyzer ("PITA-2" manufactured by Seishin Enterprise Co., Ltd.), and the diameter of a circle having the same area as each measured area is calculated to determine a volume frequency distribution using a sphere having the diameter of each circle.

The terms "average diameter (average minor axis)" and "average longitudinal length (average major axis)" used herein in connection with the potassium titanate refer to values obtained when platinum is deposited on the surface of the resulting potassium titanate using an ion sputter (manufactured by Hitachi Science Systems, Ltd.), the potassium titanate is photographed using a scanning electron microscope ("S-4700" manufactured by Hitachi High-Technologies Corporation) at such a magnification that about 250 or more particles are observed within a single field of view, each crystal particle is enclosed with a rectangle having a minimum size based on the resulting image (number of fields of view: 4 or more) using particle size distribution analysis software ("Mac-View Ver. 4" manufactured by Mountech Co., Ltd.), two hundred or more particles are measured with regard to the diameter (minor axis) and the length (major axis) (along the axes that are perpendicular to each other), and the arithmetic mean values thereof are calculated.

The term "average aspect ratio" used herein in connection with the potassium titanate refers to a value obtained when the aspect ratio (major axis/minor axis) is calculated from the minor axis and the major axis of each of two hundred or more particles measured as described above, and the arithmetic mean value thereof is calculated.

It is preferable that the content of a fibrous material (fibrous potassium titanate) in the potassium titanate produced using the method for producing a potassium titanate according to one embodiment of the invention be 1 mass % or less, more preferably 0.7 mass % or less, and still more preferably 0.5 mass % or less.

The term "fibrous material (fibrous potassium titanate)" used herein refers to a potassium titanate having a minor axis (measured as described above) of 3 μm or less, a major axis (measured as described above) of 5 μm or more, and an aspect ratio (measured as described above) of 3 or more.

The content of the fibrous material (fibrous potassium titanate) in the potassium titanate refers to a value obtained by calculating the volume of each crystal particle on the assumption that each crystal particle has a columnar shape, the minor axis measured as described above corresponds to the diameter of the column, and the major axis measured as described above corresponds to the length (height) of the column, calculating the mass of each particle from the true specific gravity of the desired potassium titanate (e.g., true specific gravity of potassium hexatitanate: 3.5 g/cm$^3$), calculating the total mass of the potassium titanate and the total mass of the fibrous material, and calculating the content of the fibrous material using the following expression.

Content (mass %) of fibrous material=[(total mass of fibrous material/total mass of potassium titanate)]×100

It is preferable that the potassium titanate obtained using the method for producing a potassium titanate according to one embodiment of the invention have a specific surface area of 2.0 to 10.0 m$^2$/g, more preferably 4.0 to 9.0 m$^2$/g, and still more preferably 5.0 to 8.0 m$^2$/g.

Note that the term "specific surface area" used herein in connection with the potassium titanate refers to a value measured using the BET method at a degassing temperature of 350° C. for a degassing time of 45 minutes utilizing a specific surface area analyzer (manufactured by Quantachrome Instruments).

It is preferable that the potassium titanate obtained using the method for producing a potassium titanate according to one embodiment of the invention have a single phase ratio of 90% or more, more preferably 92% or more, and still more preferably 95% or more.

Note that the term "single phase ratio" used herein refers to a value obtained by grinding the resulting potassium titanate using a mortar made of alumina to prepare a measurement specimen, measuring the X-ray diffraction pattern of the measurement specimen using a powder X-ray diffractometer ("X'Part-Pro MPD" manufactured by PANalytical, X-ray source: CuKα-rays), and calculating the single phase ratio from the height of the peak attributed to the potassium titanate and the height of the main peak attributed to the impurities in the X-ray diffraction pattern using the following expression.

Single phase ratio (%)=[$I/(I+S)$]×100

I: Total height of strongest peak attributed to potassium titanate (target product) detected at 2θ=0 to 50°
S: Total height of main peak attributed to impurities The term "impurities" used herein refers to a component other than the potassium titanate (target product).

When the target product is a potassium titanate represented by the general formula $K_2O \cdot nTiO_2$, the single phase ratio of the potassium titanate is calculated using the total height of the strongest peak attributed to the potassium titanate detected at 2θ=0 to 50° as the value I, and using the total height of the strongest peak attributed to a component other than the potassium titanate detected at 2θ=0 to 50° as the value S.

When the target product is potassium hexatitanate represented by $K_2O \cdot 6TiO_2$, the single phase ratio of potassium hexatitanate is calculated using the height of the strongest peak attributed to potassium hexatitanate detected at 2θ=0 to 50° as the value I, and using the total height of the strongest peak attributed to a potassium titanate and a component other than potassium hexatitanate detected at 2θ=0 to 50° as the value S.

The potassium titanate (target product) produced using the method for producing a potassium titanate according to one embodiment of the invention is preferably potassium hexatitanate represented by $K_2O \cdot 6TiO_2$. The potassium titanate may be a mixture including potassium hexatitanate and $TiO_2$, a mixture including potassium hexatitanate and another potassium titanate (e.g., potassium tetratitanate), or a mixture including potassium hexatitanate, another potassium titanate (e.g., potassium tetratitanate), and $TiO_2$.

It is preferable that the potassium titanate (target product) produced using the method for producing a potassium titanate according to one embodiment of the invention have a potassium hexatitanate single phase ratio of 90% or more, more preferably 92% or more, and still more preferably 95% or more.

According to the embodiments of the invention, a calcined powder having a reduced diameter (minor axis), an average aspect ratio (i.e., an average ratio of the longitudinal length (major axis) to the diameter (minor axis)) equal to or higher than a given value, and a relatively high content of a fibrous material, is obtained by calcining the titanium raw material and the potassium raw material at a temperature within a specific range when producing a potassium titanate by calcining the titanium raw material and the potassium raw material, and a potassium titanate having a significantly reduced fibrous potassium titanate content is easily produced in high yield by grinding (pulverizing) the calcined powder using a specific grinding means.

According to the embodiments of the invention, it is possible to easily produce a potassium titanate having an improved single phase ratio by utilizing a titanium raw material having a specific surface area within a specific range, and calcining the titanium raw material and the potassium raw material at a temperature within a specific range.

The embodiments of the invention thus provide a method that can easily produce a potassium titanate having a high single phase ratio and a significantly reduced fibrous potassium titanate content in high yield.

The potassium titanate produced using the method for producing a potassium titanate according to the embodiments of the invention exhibits excellent heat resistance, and may suitably be used as a friction modifier and the like.

EXAMPLES

The invention is further described below by way of examples and comparative examples. Note that the invention is not limited to the following examples.

The ratio of adhesion that is used as a standard for evaluating the yield of the potassium titanate in connection with the examples and the comparative examples refers to a value calculated using the following expression. Note that the term "total amount" in the expression refers to the amount (g) of potassium hexatitanate ($K_2Ti_6O_{13}$) when all of the titanium atoms included in the titanium raw material are used as the reaction raw material for producing potassium hexatitanate ($K_2Ti_6O_{13}$), and the term "amount of adhesion" in the expression refers to the difference (g) between the weight of the reaction vessel or the furnace wall material before calcination and the weight of the reaction vessel or the furnace wall material after calcination.

Ratio of adhesion (mass %)=[(amount of adhesion)/(total amount)]×100

Example 1

1. Mixing Step 113.40 kg of titanium dioxide having a specific surface area of 7.2 $m^2/g$ (manufactured by Cosmo Chemical Co., Ltd., purity: 98.8%) (titanium raw material), and 36.60 kg of potassium carbonate (manufactured by Unid Co., Ltd., purity: 99.9%) (potassium raw material), were weighed. The titanium raw material, the potassium raw material, and 1 L of a denatured alcohol (manufactured by Sankyo Chemical Ltd.) were mixed for 20 minutes using a vibrating rod mill (manufactured by Chuo Kakohki Co., Ltd.) (amplitude: 6 mm) to obtain a raw material mixture powder.

2. Calcination Step

The raw material mixture powder obtained as described above (see "1. Mixing step") was put in a saggar formed of cordierite and mullite, and calcined at a calcination temperature of 980° C. for 0.5 hours in air using a box-type electric furnace (manufactured by Motoyama Co., Ltd.) to obtain a calcined powder.

3. Grinding Step

The calcined powder obtained as described above was ground (50 kg/hr) using a vibrating rod mill (manufactured by Chuo Kakoliki Co., Ltd.) and an impact pulverizer ("ACM Pulverizer" manufactured by Hosokawa Micron Corporation) in this order to produce potassium hexatitanate.

The amount of each raw material used is listed in Table 1, and the potassium hexatitanate production conditions, the single phase ratio of the resulting potassium hexatitanate, the content of a fibrous product (fibrous potassium titanate) in the resulting potassium hexatitanate, and the ratio of adhesion during the production of potassium hexatitanate, are listed in Table 2. Note that the resulting potassium hexatitanate had an average major axis of 0.66 μm, an average minor axis of 0.23 μm, and an average aspect ratio of 3.0.

Example 2

Potassium hexatitanate was produced in the same manner as in Example 1, except that the amount of the titanium dioxide having a specific surface area of 7.2 $m^2/g$ was changed to 116.72 kg, and the amount of the potassium carbonate was changed to 33.28 kg (see "1. Mixing step").

The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 0.67 μm, an average minor axis of 0.23 μm, and an average aspect ratio of 3.0.

Example 3

Potassium hexatitanate was produced in the same manner as in Example 1, except that a tunnel kiln (manufactured by Takasago Industry Co., Ltd.) was used instead of the box-type electric furnace (manufactured by Motoyama Co., Ltd.) (see "2. Calcination step").

The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 0.65 μm, an average minor axis of 0.22 μm, and an average aspect ratio of 2.9.

Example 4

Potassium hexatitanate was produced in the same manner as in Example 1, except that a rotary kiln (manufactured by Two B M Co., Ltd.) was used instead of the box-type electric furnace (manufactured by Motoyama Co., Ltd.), and the calcination time was changed from 0.5 hours to 10 minutes (see "2. Calcination step").

The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 0.69 μm, an average minor axis of 0.24 μm, and an average aspect ratio of 2.9.

Example 5

Potassium hexatitanate was produced in the same manner as in Example 1, except that 113.48 kg of titanium dioxide having a specific surface area of 9 m$^2$/g (manufactured by China Bluestar International Chemical Co., Ltd., purity 99.9%) was used as the titanium raw material instead of 113.40 kg of the titanium dioxide having a specific surface area of 7.2 m$^2$/g, and the amount of the potassium carbonate was changed from 36.60 kg to 36.52 kg (see "1. Mixing step").

The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 0.70 μm, an average minor axis of 0.28 μm, and an average aspect ratio of 2.5.

Example 6

Potassium hexatitanate was produced in the same manner as in Example 1, except that 113.09 kg of titanium dioxide having a specific surface area of 20 m$^2$/g (manufactured by China Bluestar International Chemical Co., Ltd., purity: 99.9%) was used as the titanium raw material instead of 113.40 kg of the titanium dioxide having a specific surface area of 7.2 m$^2$/g, and the amount of the potassium carbonate was changed from 36.60 kg to 36.91 kg (see "1. Mixing step"), The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 0.74 μm, an average minor axis of 0.29 μm, and an average aspect ratio of 2.6.

Example 7

Potassium hexatitanate was produced in the same manner as in Example 1, except that 113.09 kg of titanium dioxide having a specific surface area of 180 m$^2$/g (purity: 99.9%) (obtained by neutralizing a titanium tetrachloride aqueous solution with aqueous ammonia, and drying the mixture at 100° C.) was used as the titanium raw material instead of 113.40 kg of the titanium dioxide having a specific surface area of 7.2 m$^2$/g, and the amount of the potassium carbonate was changed from 36.60 kg to 36.91 kg (see "1. Mixing step").

The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 0.80 μm, an average minor axis of 0.30 μm, and an average aspect ratio of 2.7.

Example 8

Potassium hexatitanate was produced in the same manner as in Example 1, except that 56.99 kg of titanium dioxide having a specific surface area of 7.2 m$^2$/g (manufactured by Cosmo Chemical Co., Ltd., purity: 98,8%) and 56.99 kg of titanium dioxide having a specific surface area of 1.6 m$^2$/g (manufactured by Rio Tinto Fer et Titane Inc., purity: 94.7%) were used as the titanium raw material, and the amount of the potassium carbonate was changed from 36.60 kg to 36.02 kg (see "2. Calcination step").

The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 0.64 μm, an average minor axis of 0.22 μm, and an average aspect ratio of 2.9.

Example 9

Potassium hexatitanate was produced in the same manner as in Example 1, except that only a vibrating rod mill (manufactured by Chuo Kakohki Co., Ltd.) was used as the grinding means (instead of using a vibrating rod mill (manufactured by Chuo Kakohki Co., Ltd.) and an impact pulverizer ("ACM Pulverizer" manufactured by Hosokawa Micron Corporation)) (see "3. Grinding step").

The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 1.25 μm, an average minor axis of 0.32 μm, and an average aspect ratio of 3.0.

Example 10

Potassium hexatitanate was produced in the same manlier as in Example 1, except that only an impact pulverizer ("ACM Pulverizer" manufactured by Hosokawa Micron Corporation) was used as the grinding means (instead of using a vibrating rod mill (manufactured by Chuo Kakohki Co., Ltd.) and an impact pulverizer ("ACM Pulverizer" manufactured by Hosokawa Micron Corporation)) (see "3. Grinding step"). The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 1.22 μm, an average minor axis of 0.35 μm, and an average aspect ratio of 2.7.

Example 11

Potassium hexatitanate was produced in the same manner as in Example 1, except that 107.51 kg of titanium dioxide having a specific surface area of 7.2 m²/g (manufactured by Cosmo Chemical Co., Ltd., purity: 98.8%) and 5.07 kg of a titanium metal powder (manufactured by Tohotec Co., Ltd, purity: 98.6%) were used as the titanium raw material, and the amount of the potassium carbonate was changed from 36.60 kg to 37.42 kg (see "1. Mixing step").

The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 0.92 μm, an average minor axis of 0.33 μm, and an average aspect ratio of 2.8.

Example 12

Potassium hexatitanate was produced in the same manner as in Example 1, except that the calcination temperature was changed to 965° C. (see "2. Calcination step").

The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 0.62 μm, an average minor axis of 0.19 μm, and an average aspect ratio of 3.2.

Example 13

Potassium hexatitanate was produced in the same manner as in Example 1, except that the calcined powder was ground using an impact pulverizer ("ACM Pulverizer" manufactured by Hosokawa Micron Corporation) and a vibrating rod mill (manufactured by Chuo Kakohki Co., Ltd.) in this order (instead of grinding the calcined powder using a vibrating rod mill (manufactured by Chuo Kakohki Co., Ltd.) and an impact pulverizer ("ACM Pulverizer" manufactured by Hosokawa Micron Corporation) in that order) (see "3. Grinding step").

The amount of each raw material used is listed in Table 1, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 2. Note that the resulting potassium hexatitanate had an average major axis of 0.69 μm, an average minor axis of 0.24 μm, and an average aspect ratio of 2.9.

TABLE 1

| | Titanium dioxide (kg) | | | | | Titanium metal (kg) | Potassium carbonate (kg) |
| | Specific surface area: 180 (m²/g) | Specific surface area: 20 (m²/g) | Specific surface area: 9 (m²/g) | Specific surface area: 7.2 (m²/g) | Specific surface area: 1.6 (m²/g) | | |
|---|---|---|---|---|---|---|---|
| Example 1 | 0 | 0 | 0 | 113.40 | 0 | 0 | 36.60 |
| Example 2 | 0 | 0 | 0 | 116.72 | 0 | 0 | 33.28 |
| Example 3 | 0 | 0 | 0 | 113.40 | 0 | 0 | 36.60 |
| Example 4 | 0 | 0 | 0 | 113.40 | 0 | 0 | 36.60 |
| Example 5 | 0 | 0 | 113.18 | 0 | 0 | 0 | 36.52 |
| Example 6 | 0 | 113.09 | 0 | 0 | 0 | 0 | 36.91 |
| Example 7 | 113.09 | 0 | 0 | 0 | 0 | 0 | 36.91 |
| Example 8 | 0 | 0 | 0 | 56.99 | 56.99 | 0 | 36.02 |
| Example 9 | 0 | 0 | 0 | 113.40 | 0 | 0 | 36.60 |
| Example 10 | 0 | 0 | 0 | 113.40 | 0 | 0 | 36.60 |
| Example 11 | 0 | 0 | 0 | 107.51 | 0 | 5.07 | 37.42 |
| Example 12 | 0 | 0 | 0 | 113.40 | 0 | 0 | 36.60 |
| Example 13 | 0 | 0 | 0 | 113.40 | 0 | 0 | 36.60 |

TABLE 2

| | Calcination furnace | Calcination temperature (° C.) | Grinder | Single phase ratio (%) | Fibrous material content (%) | Ratio of adhesion (%) |
|---|---|---|---|---|---|---|
| Example 1 | Box-type electric furnace | 980 | Vibrating mill + ACM | 99 | 0.02 | 0.05 |
| Example 2 | Box-type electric furnace | 980 | Vibrating mill + ACM | 93 | 0.02 | 0.05 |
| Example 3 | Tunnel kiln | 980 | Vibrating mill + ACM | 98 | 0.02 | 0.05 |
| Example 4 | Rotary kiln | 980 | Vibrating mill + ACM | 97 | 0.03 | 0.12 |
| Example 5 | Box-type electric furnace | 980 | Vibrating mill + ACM | 97 | 0.03 | 0.08 |
| Example 6 | Box-type electric furnace | 980 | Vibrating mill + ACM | 97 | 0.03 | 0.09 |
| Example 7 | Box-type electric furnace | 980 | Vibrating mill + ACM | 97 | 0.05 | 0.25 |
| Example 8 | Box-type electric furnace | 980 | Vibrating mill + ACM | 97 | 0.06 | 0.04 |
| Example 9 | Box-type electric furnace | 980 | Vibrating mill | 99 | 0.23 | 0.05 |
| Example 10 | Box-type electric furnace | 980 | ACM | 99 | 0.44 | 0.05 |
| Example 11 | Box-type electric furnace | 980 | Vibrating mill + ACM | 92 | 0.02 | 0.06 |
| Example 12 | Box-type electric furnace | 965 | Vibrating mill + ACM | 91 | 0.12 | 0.22 |
| Example 13 | Box-type electric furnace | 980 | ACM + Vibrating mill | 99 | 0.04 | 0.05 |

Note:
The term "Vibrating mill" refers to the vibrating rod mill, and the term "ACM" refers to the ACM pulverizer.

Comparative Example 1

Potassium hexatitanate was produced in the same manner as in Example 1, except that 114.59 kg of titanium dioxide having a specific surface area of 1.6 m²/g (manufactured by Rio Tinto Fer et Titane Inc., purity: 94.7%) was used as the titanium raw material instead of 113.40 kg of the titanium dioxide having a specific surface area of 7.2 m²/g, and the amount of the potassium carbonate was changed from 36.60 kg to 35.41 kg (see "1. Mixing step").

The amount of each raw material used is listed in Table 3, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 4. Note that the resulting potassium hexatitanate had an average major axis of 0.69 µm, an average minor axis of 0.18 µm, and an average aspect ratio of 3.8.

Comparative Example 2

Potassium hexatitanate was produced in the same manner as in Example 1, except that 22.87 kg of titanium dioxide having a specific surface area of 7.2 m²/g (manufactured by Cosmo Chemical Co., Ltd., purity: 98.8%) and 91.48 kg of titanium dioxide having a specific surface area of 1.6 m²/g (manufactured by Rio Tinto Fer et Titane Inc., purity: 94.7 were used as the titanium raw material instead of 113.40 kg of the titanium dioxide having a specific surface area of 7.2 m²/g, and the amount of the potassium carbonate was changed from 36.60 kg to 35.65 kg (see "1. Mixing step").

The amount of each raw material used is listed in Table 3, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 4. Note that the resulting potassium hexatitanate had an average major axis of 0.67 µm, an average minor axis of 0.20 µm, and an average aspect ratio of 3.4.

Comparative Example 3

Potassium hexatitanate was produced in the same manner as in Example 1, except that 113.09 kg of titanium dioxide having a specific surface area of 250 m²/g (purity: 99.9%) (obtained by neutralizing a titanium tetrachloride aqueous solution with aqueous ammonia, and drying the mixture at 90° C.) was used as the titanium raw material instead of 113.40 kg of the titanium dioxide having a specific surface area of 7.2 m²/g (see "1. Mixing step").

The amount of each raw material used is listed in Table 3, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 4. Note that the resulting potassium hexatitanate had an average major axis of 0.93 µm, an average minor axis of 0.32 µm, and an average aspect ratio of 3.0.

Comparative Example 4

Potassium hexatitanate was produced in the same manner as in Example 1, except that the calcination temperature was changed from 980° C. to 1,080° C. (see "2. Calcination step").

The amount of each raw material used is listed in Table 3, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 4. Note that the resulting potassium hexatitanate had an average major axis of 2.80 µm, an average minor axis of 0.82 µm, and an average aspect ratio of 3.4.

Comparative Example 5

Potassium hexatitanate was produced in the same manner as in Example 1, except that the calcination temperature was changed from 980° C. to 920° C. (see "2. Calcination step").

The amount of each raw material used is listed in Table 3, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 4. Note that the resulting potassium hexatitanate had an average major axis of 0.52 µm, an average minor axis of 0.12 µm, and an average aspect ratio of 4.3.

Comparative Example 6

Potassium hexatitanate was produced in the same manner as in Example 1, except that the grinding step (see "3. Grinding step") was not performed.

The amount of each raw material used is listed in Table 3, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 4. Note that the resulting potassium hexatitanate had an average major axis of 1.40 µm, an average minor axis of 0.33 µm, and an average aspect ratio of 4.2.

Comparative Example 7

Potassium hexatitanate was produced in the same manner as in Example 1, except that the amount of the titanium dioxide having a specific surface area of 7.2 m²/g was changed to 116.72 kg, the amount of the potassium carbonate was changed to 33.28 kg, a Henschel mixer (manufactured by Nippon Coke & Engineering. Co., Ltd.) was used as the mixing means (see "1. Mixing step"), the calcination step (see "2. Calcination step") was performed at a calcination temperature of 940° C. for 2 hours in air using a rotary kiln, and the grinding step (see "3. Grinding step") was not performed.

The amount of each raw material used is listed in Table 3, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 4. Note that the resulting potassium hexatitanate had an average major axis of 0.42 µm, an average minor axis of 0.11 µm, and an average aspect ratio of 3.8.

Comparative Example 8

Potassium hexatitanate was produced in the same manner as in Example 1, except that 106.86 kg of titanium dioxide having a specific surface area of 7.2 m²/g (manufactured by Casino Chemical Co., Ltd., purity: 98.8%) and 5.62 kg of a titanium metal powder (manufactured by Tohotec Co., Ltd., purity: 98.6%) were used as the titanium raw material, and the amount of the potassium carbonate was changed from 36.60 kg to 37.52 kg (see "1. Mixing step").

The amount of each raw material used is listed in Table 3, and the potassium hexatitanate production conditions, the single phase ratio of the resulting potassium hexatitanate, the content of a fibrous product in the resulting potassium hexatitanate, and the ratio of adhesion during the production of potassium hexatitanate, are listed in Table 4. Note that the resulting potassium hexatitanate had an average major axis of 0.70 μm, an average minor axis of 0.24 μm, and an average aspect ratio of 2.9.

mass % of titanium dioxide having a specific surface area of 1 to 2 m²/g, 40 to 100 mass % of titanium dioxide having a specific surface area of 7 to 200 m²/g, and 0 to 4.5 mass % in total of one or more materials selected from titanium metal and titanium hydride, and the potassium raw material including a potassium compound; the calcination step that calcines the raw material mixture obtained by the mixing step at a calcination temperature of 950 to 1,050° C.; and the grinding step that grinds the calcined powder obtained by the calcination step using one or more means selected from a vibrating mill and an impact pulverizer (see Tables 1 and 2).

As is clear from a comparison between Example 1 and Comparative Example 6 (see Tables 1 to 4), it was possible

TABLE 3

| | Titanium dioxide (kg) | | | | | Titanium metal (kg) | Potassium carbonate (kg) |
|---|---|---|---|---|---|---|---|
| | Specific surface area: 250 (m²/g) | Specific surface area: 20 (m²/g) | Specific surface area: 9 (m²/g) | Specific surface area: 7.2 (m²/g) | Specific surface area: 1.6 (m²/g) | | |
| Comparative Example 1 | 0 | 0 | 0 | 0 | 114.59 | 0 | 35.41 |
| Comparative Example 2 | 0 | 0 | 0 | 22.87 | 91.48 | 0 | 35.65 |
| Comparative Example 3 | 113.09 | 0 | 0 | 0 | 0 | 0 | 36.60 |
| Comparative Example 4 | 0 | 0 | 0 | 113.40 | 0 | 0 | 36.60 |
| Comparative Example 5 | 0 | 0 | 0 | 113.40 | 0 | 0 | 36.60 |
| Comparative Example 6 | 0 | 0 | 0 | 113.40 | 0 | 0 | 36.60 |
| Comparative Example 7 | 0 | 0 | 0 | 116.72 | 0 | 0 | 33.28 |
| Comparative Example 8 | 0 | 0 | 0 | 106.86 | 0 | 5.62 | 37.52 |

TABLE 4

| | Calcination furnace | Calcination temperature (° C.) | Grinder | Single phase ratio (%) | Fibrous material content (%) | Ratio of adhesion (%) |
|---|---|---|---|---|---|---|
| Comparative Example 1 | Box-type electric furnace | 980 | Vibrating mill + ACM | 97 | 1.22 | 0.04 |
| Comparative Example 2 | Box-type electric furnace | 980 | Vibrating mill + ACM | 97 | 1.02 | 0.04 |
| Comparative Example 3 | Box-type electric furnace | 980 | Vibrating mill + ACM | 97 | 1.02 | 0.55 |
| Comparative Example 4 | Box-type electric furnace | 1080 | Vibrating mill + ACM | 95 | 1.13 | 0.21 |
| Comparative Example 5 | Box.type electric thmace | 920 | Vibrating mill + ACM | 87 | 0.09 | 0.05 |
| Comparative Example 6 | Box-type electric furnace | 980 | — | 100 | 3.50 | 0.05 |
| Comparative Example 7 | Rotary kiln | 940 | — | 87 | 0.88 | 0.08 |
| Comparative Example 8 | Box-type electric furnace | 980 | Vibrating mill + ACM | 88 | 0.04 | 0.07 |

Note:
The term "Vibrating mill" refers to the vibrating rod mill, and the term "ACM" refers to the ACM pulverizer.

In Examples 1 to 13, a potassium titanate having a high single phase ratio and a significantly reduced fibrous potassium titanate content could be easily produced in high yield by producing a potassium titanate by performing the mixing step that mixes the titanium raw material with the potassium raw material, the titanium raw material including 0 to 60 to obtain a calcined powder having a reduced diameter (minor axis), an average aspect ratio (i.e., an average ratio of the longitudinal length (major axis) to the diameter (minor axis)) equal to or higher than a given value, and a relatively high content of a fibrous material, by calcining the titanium raw material and the potassium raw material at a temperature within a specific range when producing a potassium titanate by calcining the titanium raw material and the potassium raw material, and easily produce a potassium titanate having a significantly reduced fibrous potassium titanate content in high yield by grinding (pulverizing) the calcined powder using a specific grinding means.

As shown in Tables 3 and 4, when only titanium oxide having a specific surface area of 1.6 m²/g was used as the titanium raw material in the mixing step (Comparative Example 1), or when titanium oxide having a specific surface area of 250 m²/g was used (Comparative Example 3), or when the amount of titanium oxide having a specific surface area of 7.2 m²/g was insufficient (Comparative Examples 2 and 8), or when a vibrating mill was not used as the mixing means in the mixing step (Comparative Example 7), or when the calcination temperature employed in the calcination step was too high (Comparative Example 4), or when the calcination temperature was too low (Comparative Examples 5 and 7), or when the grinding step was not performed (Comparative Examples 6 and 7), the single phase ratio was low (Comparative Examples 5, 7, and 8), or the content of a fibrous material was high (Comparative Examples 1, 2, 3, 4, and 6), or the ratio of adhesion was high (Comparative Example 3).

INDUSTRIAL APPLICABILITY

The embodiments of the invention can thus provide a method that can easily produce a potassium titanate having a high single phase ratio and a significantly reduced fibrous potassium titanate content in high yield.

The invention claimed is:

1. A method for producing a potassium titanate consisting essentially of:
 a mixing step that mixes a titanium raw material with a potassium raw material, the titanium raw material comprising 80 to 100 mass % of titanium oxide having a specific surface area of 7 to 50 m²/g, and 0 to 4.5 mass % in total of one or more materials selected from titanium metal and titanium hydride, and the potassium raw material comprising a potassium compound;
 a calcination step that calcines a raw material mixture obtained by the mixing step at a calcination temperature of 950 to 990° C.;
 a grinding step that grinds a calcined powder obtained by the calcination step using a vibrating mill and an impact pulverizer;
 wherein after the calcination step, the method is performed without pH adjustment and without an acid wash;
 the vibrating mill is at least one selected from a vibrating rod mill and a vibrating ball mill; and
 the impact pulverizer is at least one selected from a high-speed rotary mill, high-speed rotary mill provided with a classifier, a media agitating mill, and a jet mill.

2. The method for producing a potassium titanate according to claim 1, wherein the mixing step mixes the titanium raw material and the potassium raw material using the vibrating mill.

3. The method for producing potassium titanate of claim 1, wherein said grinding step is implemented by grinding a calcined powder obtained by the calcination step using the vibrating mill, which is followed by grinding with the impact pulverizer.

4. The method for producing potassium titanate of claim 1, wherein the obtained potassium titanate is potassium hexatitanate.

5. The method for producing potassium titanate of claim 1, wherein the impact pulverizer is a high-speed rotary mill provided with a classifier.

6. The method for producing potassium titanate of claim 1, wherein the vibrating mill is a vibrating rod mill.

* * * * *